UNITED STATES PATENT OFFICE.

WILLIAM A. LODER, OF PITTSFORD, NEW YORK.

PROCESS OF MAKING PICKLES.

SPECIFICATION forming part of Letters Patent No. 723,693, dated March 24, 1903.

Application filed July 24, 1902. Serial No. 116,874. (No specimens.)

*To all whom it may concern:*

Be it known that I, WILLIAM A. LODER, a citizen of the United States, residing at Pittsford, in the county of Monroe and State of New York, have invented a new and useful Improvement in Processes of Making Pickles, which improvement is fully set forth in the following specification.

This invention relates to the process of producing edible pickles directly from green cucumbers by simple means, both without the application of heat and the use of drugs or chemicals deleterious to health as heretofore commonly employed; and the invention has for its objects, first, to render the process more expeditious and cheaper; second, to render the product more wholesome, tender, and digestible; third, to dispense with large and costly tanks and vats covering useful ground and occupying valuable space at the factory, and, fourth, to make the pickles in the original kegs or barrels in which the cucumbers are placed when picked from the vines and in which they are sent to the market and without subjecting them to subsequent handling.

By my new process the cucumbers are gathered and primarily washed and placed directly in the kegs, barrels, or other packages in which they are to be shipped to the trade. Then a liquid compound of salt and vinegar, cold, is prepared and poured over the cucumbers, the vinegar being about thirty-grain strength, with six ounces of salt to the gallon. This liquid is allowed to act upon the cucumbers until slight fermentation takes place and ceases, usually four to ten days. The liquid, weakened and impoverished from being drawn upon by the green cucumbers, is then drawn off, and for sweet pickles the partially-cured cucumbers are then thoroughly rinsed or washed with clear cold water to remove the remaining salt not taken up by them. The pickles are then covered with a mild vinegar of about thirty-grain strength, with sugar added to a gravity of twelve to twenty, as may be desired, and the whole left to stand twenty-five to thirty days, after which this syrup is taken off and again brought up to its original sweetness and strength. Spices are then added to it, as desired, when this syrup is again poured over the pickles, which are now ready for shipment and use, being completely cured and tender, and without having the grain or fiber and the natural oils of the cucumber destroyed by heat or excessive salting, and the natural color of the cucumber is preserved.

For the sour variety of pickles the cucumbers are not washed after the first supply of vinegar is drawn off, as for the sweet pickles, but fresh strong vinegar of forty to fifty grains strength, according to the sourness of the pickles desired, with spices added, is again poured over them, the pickles being now ready for the market.

By treating the cucumbers as described they are handled but once—that is to say, when picking and primarily washing them; nor are they subjected to the action of heat at any stage of the process of producing the pickles. On account of this manner of producing the pickles bulky and expensive tanks and vats are dispensed with, which not only materially reduces the cost of production, but much valuable space and ground room is thereby saved at the manufactory, which is of very great importance.

What I claim as my invention, and desire to secure by Letters Patent, is—

1. The herein-described process of making pickles which consists in primarily treating cucumbers with a substantially cold solution of salt and vinegar in the proportion of substantially six ounces of salt to a gallon of vinegar, allowing said liquid to act until fermentation takes place and ceases, drawing off the impoverished and weakened liquid, then covering the pickles with a fresh vinegar, substantially as described.

2. The herein-described process of making pickles which consists in primarily treating cucumbers with salted vinegar substantially cold, in the proportion of substantially six ounces of salt to a gallon of vinegar, allowing said liquid to act until fermentation takes place and ceases, drawing off the impoverished and weakened liquid, then covering the pickles with a fresh sweetened vinegar, allowing the same to stand until the sweetness is absorbed by the pickles, then withdrawing the liquid and finally covering the pickles with a syrup of former sweetness and strength, substantially as described.

In witness whereof I have hereunto set my hand, this 21st day of July, 1902, in the presence of two subscribing witnesses.

WILLIAM A. LODER.

Witnesses:
ENOS B. WHITMORE,
MINNIE SMITH.